United States Patent Office 2,911,994
Patented Nov. 10, 1959

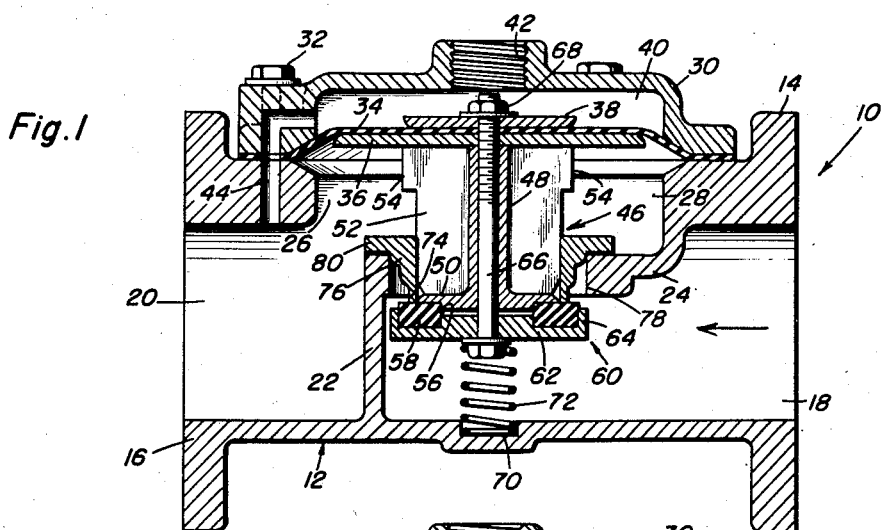
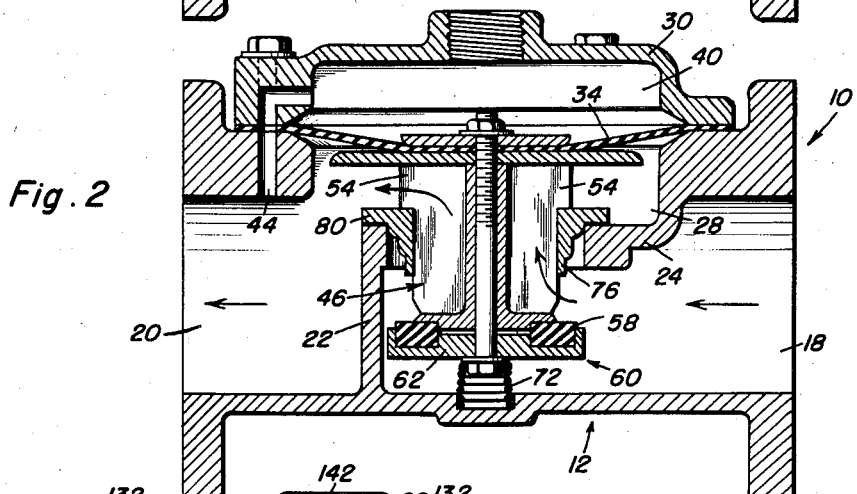
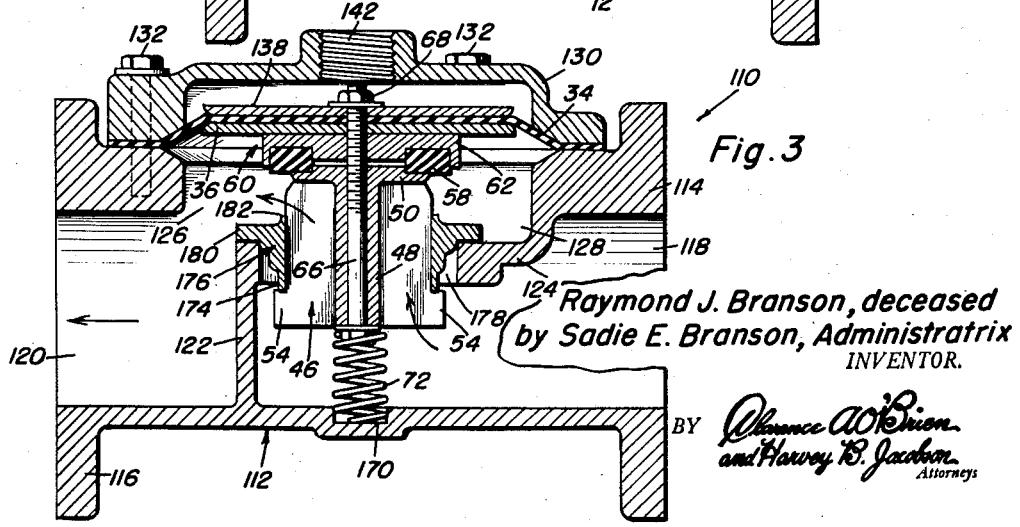
Raymond J. Branson, deceased
by Sadie E. Branson, Administratrix
INVENTOR.

2,911,994

AUTOMATIC DUMP VALVE

Raymond J. Branson, deceased, late of Tulsa, Okla., by Sadie E. Branson, administratrix, Tulsa, Okla., assignor of one-third to Sadie E. Branson, individually, one-third to Raymond K. Branson, and one-third to Lester L. Branson Application May 10, 1955, Serial No. 507,217

3 Claims. (Cl. 137—270)

This invention relates in general to new and useful improvements in valve construction, and more specifically to an improved dump valve construction.

It is the primary object of this invention to provide an improved dump valve construction which includes at least one valve member resiliently urged to a normal position and a diaphragm connected to said valve member for actuation upon the application of fluid pressure thereagainst to move the valve member to an opposite position.

Another object of this invention is to provide an improved valve construction which includes a valve body, a closure plate, a diaphragm, and a valve member which may be utilized in conjunction with various types of valve seats and guide members to form dump valves of various types having different operating characteristics.

Still another object of this invention is to provide an improved shut-off valve construction, the shut-off valve construction including a replaceable insert having a valve seat formed thereon, a guide member engageable in the insert for guiding and positioning a valve member carried thereby with respect to the valve seat, a spring member engaged with the guide member for urging the valve member to a normal position, and a diaphragm connected to the valve member for moving the valve member in opposition to the spring whereby the valve member may be selectively moved between open and closed positions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view taken through a first form of dump valve and shows the general details thereof, the valve member thereof being urged to a normally closed position by means of a spring;

Figure 2 is a vertical sectional view similar to Figure 1 of the valve of Figure 1 and shows a valve member thereof moved to an opened position by exerting a pressure upon a diaphragm connected to the valve member; and Figure 3 is a longitudinal vertical sectional view similar to Figure 1 and shows a slightly modified form of valve construction, the insert including the valve seat of the valve of Figure 1 being in place and the valve member and guide member of the valve of Figure 1 being inverted in position and the valve member being resiliently urged to a normally opened position by the spring.

Referring now to the drawings in detail, it will be seen that there is illustrated in Figures 1 and 2 a preferred form of dump valve which is referred to in general by the reference numeral 10. The dump valve 10 is of the shut-off type and includes a valve body which is referred to in general by the reference numeral 12. The valve body 12 is provided at opposite ends thereof with connecting flanges 14 and 16. Opening through the connecting flange 14 is an inlet 18. Opening through the flange 16 is an outlet 20, the inlet 18 and the outlet 20 being in alignment.

In order that direct flow between the inlet 18 and the outlet 20 may be prevented, the valve body 12 includes a first partition wall 22 disposed normal to the inlet 18 and the outlet 20. Extending between a free end of the first partition wall 22 and a portion of the valve body 12 adjacent the connecting flange 14 is a second partition wall 24. The partition wall 24 is disposed parallel to the axes of the inlet 18 and the outlet 20 and normal to the partition wall 22.

Formed in the valve body 12 in alignment with the partition wall 24 is an enlarged opening 26. The opening 26 forms a chamber 28 above the partition wall 24, the chamber 28 being communicated with the outlet 20. Closing the opening 26 is an inverted dished closure plate 30 which is secured to the exterior surface of the valve body 12 by means of circumferentially spaced fasteners 32. Disposed between the closure plate 30 and the valve body proper is a diaphragm 34. Secured to the opposite face of the diaphragm 34 are plates 36 and 38, the plate 36 being of a much larger diameter than the plate 38. The diaphragm 34 forms within the closure plate 30 a chamber 40. The closure plate 30 includes an internally threaded bore 42 for receiving a pressure fitting (not shown) for permitting fluid under pressure into the chamber 40. The chamber 40 is communicated with the outlet 20 by a bleed-off passage 44 formed through the closure plate 30 and the valve body 12.

Secured to the underside of the diaphragm 34 in abutment with the plate 36 is a guide member which is referred to in general by the reference numeral 46. The guide member 46 includes a sleeve-like central portion 48 which has connected to the lower end thereof a head 50. Radiating from the sleeve portion 48 is a plurality of guide fingers 52 which are provided at their upper ends with stops 54.

The head 50 has formed in the underside thereof an annular recess 56 in which there is partially seated a replaceable valve washer 58. The valve member 58 is part of a valve member, which is referred to in general by the reference numeral 60, the valve member 60 including a valve plate 62 having an annular recess 64 in which the valve washer 58 is also partially seated. Extending through the valve plate 62, the sleeve portion 48, the plates 36 and 38, and the diaphragm 34 is an elongated bolt 66. The upper end of the bolt 66 is provided with a nut 68 to connect the various parts together as a unit.

Formed in the valve body 12 within the general confines of the inlet 18 and in alignment with the bolt 66 is a spring seat 70. The spring seat 70 has seated therein a spring 72 which has its opposite end in abutment with the valve plate 62. The spring 72 normally urges the valve washer 58 of the valve member 60 into sealing engagement with a valve seat 74. The valve seat 74 is part of a removable insert 76 seated in a communicating passage 78 formed in the second partition wall 24. The insert 76 is provided at the end thereof remote from the valve seat 74 with a flange 80 which seats upon the upper surface of the second partition wall 24.

In the operation of the valve 10, fluid pressure is exerted upon the underside of the valve member 60 through the inlet 18. This fluid pressure aids the spring 72 in urging the valve member 60 to a closed position.

The valve 10 is intended to be utilized as a dump valve for the purpose of emptying water from an oil tank or the like. In order that the valve 10 may be actuated, there will be provided a pilot valve (not shown) of a conventional type which is calibrated between the specific gravity of oil and the specific gravity of water so as to be actuated by water. When there is a sufficient amount of water within the bottom of an oil tank, the pilot valve will permit water under pressure to enter into the chamber 40 and such pressure will move the diaphragm 34 downwardly and to move the valve member 60 also downwardly and to open the communicating passage 78 between the inlet 18 and the outlet 20. A certain amount of the water entering the chamber 40 will also bleed into the outlet 20 through the bleed-off passage 44. After the water has been drained out of the oil tank (not shown) the pilot valve (not shown) will then shut off the supply of water to the chamber 40 and the spring 72 will return the valve member 60 to its seated position. This will then prevent the dumping of water from the fuel tank.

Referring now to Figure 2 in particular, it will be seen that when the valve member 60 is in an open position, the stops 54 engage the upper flange 80 of the insert 76. This limits the downward movement of the valve member 60 to control the amount of opening thereof.

Referring now to Figure 3 in particular, it will be seen that there is illustrated a modified form of dump valve which is referred to in general by the reference numeral 110. The dump valve 110 includes a valve body which is referred to in general by the reference numeral 112. The valve body 112 is identical with the valve body 12 with the exception of the bleed-off passage 44 which has been eliminated. The valve body 112 includes portions 114, 116, 118, 120, 122, 124, 170 and 178 which are identical with the similar portions 14, 16, 18, 20, 22, 24, 70 and 78 of the valve body 12. Accordingly, no further description of the valve body 112 is believed to be necessary.

The valve body 112 also includes an opening 126 which is in alignment with the partition wall 124, the opening 126 forming a chamber 128 above the partition wall 124. Closing the opening 126 is a closure plate 130, the closure plate 130 being identical with the closure plate 30 with the exception of the bleed-off passage 44 which has been omitted. The closure plate 130 is secured to the valve body 112 by suitable fasteners 132. The closure plate 130 also includes a threaded bore 142 which is identical with the bore 42.

Disposed between the closure plate 130 and the body proper of the valve body 112 is the diaphragm 34. Secured to the underside of the diaphragm 34 is the plate 36. The plate 38 has been replaced by a larger diameter plate 138.

The insert 76 has been replaced by an insert 176. The insert 176 includes a lower valve seat 174 and is provided adjacent the upper end thereof with a flange 180 which rests upon the upper surface of the partition wall 24. The insert 176 differs from the insert 76 in that it is provided in the upper end thereof with another valve seat 182.

The guide member 54 has been inverted together with the valve member 60. The valve member 60 now has the valve plate 62 thereof in abutting engagement with the plate 36 and the diaphragm 34. The sleeve portion 48 of the guide member 46 has the lower end thereof engaged by the spring 72 seated in the spring seat 170 to urge the valve member 60 upwardly and away from the valve seat 182.

The dump valve 110 is normally in an open position to permit the flow of fluids therethrough. The operation of the dump valve 110 may be controlled by attaching a controllable pressure source to the closure plate 130 by means of the threaded bore 42. The application of pressure above the diaphragm 34 will urge the same downwardly to move the valve member 60 into seating engagement with the valve seat 182 to shut off the flow of fluid through the shut-off valve structure of the dump valve 110. It will be readily apparent from the foregoing description that like parts of the valves 10 and 110 operate in similar manners although the parts may have their positions reversed and the operating characteristics of the two valves are different.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shut-off valve comprising a valve body, an inlet at one end of said valve body, an outlet at the opposite end of said valve body, a communicating passage between said inlet and said outlet, said valve body including a first partition wall disposed normal to said inlet and said outlet, a second partition wall disposed parallel to said inlet and said outlet, said communicating passage extending through said second partition wall, a valve seat removably carried by said second partition wall for replacement, said valve seat being in the form of a tubular insert having oppositely directed surfaces at opposite ends thereof, a valve member engageable with one of said valve seat surfaces to close said communicating passage, an opening through said valve body aligned with said valve, a closure plate closing said opening, a diaphragm disposed between said closure plate and said valve body, guide means carried by said valve member guidingly engaged with said insert to position said valve member relative to said valve seat, said guide means having stop shoulders engageable with the other of said valve seat surfaces to limit opening movement of said valve member, the distance between said valve member and said stop shoulders minus the distance between said valve seat surfaces being less than the length of permissible diaphragm travel, and support means connected to said diaphragm for selectively mounting said valve member and said guide means on said diaphragm in upright and inverted position to selectively change the function of said valve.

2. The valve of claim 1 wherein said valve body includes a spring seat remote from said opening, a spring extending between said spring seat and said valve member and urging said valve member to an open position, said closure plate having a pressure fitting supplying a pressure to said diaphragm to move said valve member to a closed position.

3. The valve of claim 1 wherein said valve body includes a spring seat remote from said opening, a spring extending between said spring seat and said valve member and urging said valve member to a closed position, said closure plate having a pressure fitting supplying a pressure to said diaphragm to move said valve member to an open position.

References Cited in the file of this patent

UNITED STATES PATENTS

| | | |
|---|---|---|
| 518,000 | Davis | Apr. 10, 1894 |
| 602,170 | Rix | Apr. 12, 1898 |
| 1,146,832 | Wulf | July 20, 1915 |
| 1,361,278 | Neal | Dec. 7, 1920 |
| 1,498,024 | Fant | June 17, 1924 |
| 2,599,872 | Slonneger | June 10, 1952 |
| 2,631,600 | Flanagan | Mar. 17, 1953 |
| 2,648,490 | Messinger | Aug. 11, 1953 |